(12) United States Patent
Schmidt

(10) Patent No.: US 7,877,064 B2
(45) Date of Patent: Jan. 25, 2011

(54) METHODS, APPARATUS AND SYSTEMS FOR TERRESTRIAL WIRELESS BROADCAST OF DIGITAL DATA TO STATIONARY RECEIVERS

(75) Inventor: Mark S. Schmidt, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1700 days.

(21) Appl. No.: 10/978,602

(22) Filed: Nov. 1, 2004

(65) Prior Publication Data

US 2006/0092902 A1    May 4, 2006

(51) Int. Cl.
*B01L 99/00* (2010.01)

(52) U.S. Cl. .................... 455/103; 455/3.02; 455/101; 455/108; 455/110; 455/126; 370/347; 375/267; 375/285; 375/299

(58) Field of Classification Search ............... 455/427, 455/428, 3.02, 126, 103, 101, 102, 108; 370/347; 375/267, 285, 299
See application file for complete search history.

(56) References Cited

U.S. PATENT DOCUMENTS 4,628,517 A * 12/1986 Schwarz et al. ............. 375/267

5,487,069 A    1/1996 O'Sullivan et al.
5,521,943 A    5/1996 Dambacher (Continued)

FOREIGN PATENT DOCUMENTS

EP    0222076    *    5/1987

(Continued)

OTHER PUBLICATIONS

ETSI EN 300 744 V1.5.1 (Jun. 2004), Digital Video Broadcasting (DVB); Framing structure, channel coding and modulation for digital terrestrial television.*

(Continued)

*Primary Examiner*—Lester Kincaid
*Assistant Examiner*—Mehmood B Khan
(74) *Attorney, Agent, or Firm*—Larry T. Cullen

(57) ABSTRACT

The present invention provides methods, apparatus and systems for delivery of digital data to stationary receivers over a terrestrial wireless link at a low data rate using a new coded orthogonal frequency division multiplexing (COFDM) scheme. Digital data is encoded and modulated using coded orthogonal frequency division multiplexing (COFDM) to produce a data stream. The data stream is communicated to a stationary receiver via a terrestrial wireless link having a ratio of (i) 50% coherence bandwidth to (ii) allocated channel bandwidth of not greater than 50%. The COFDM scheme employed by the present invention overcomes the degradation of multipath fading induced by terrestrial channels, such as the Ultra High Frequency (UHF) broadcast channel.

27 Claims, 7 Drawing Sheets

U.S. PATENT DOCUMENTS

| | | | |
|---|---|---|---|
| 5,528,581 A * | 6/1996 | De Bot | 370/203 |
| 6,137,847 A | 10/2000 | Stott et al. | |
| 6,151,296 A | 11/2000 | Vijayan et al. | |
| 6,205,188 B1 | 3/2001 | Stott et al. | |
| 6,282,168 B1 | 8/2001 | Vijayan et al. | |
| 6,359,938 B1 | 3/2002 | Keevill et al. | |
| 6,362,784 B1 * | 3/2002 | Kane et al. | 343/700 MS |
| 6,594,320 B1 * | 7/2003 | Sayeed | 375/281 |
| 6,628,730 B1 | 9/2003 | Stott et al. | |
| 6,639,555 B1 * | 10/2003 | Kane et al. | 343/700 MS |
| 6,741,834 B1 * | 5/2004 | Godwin | 455/3.01 |
| 7,146,134 B2 * | 12/2006 | Moon et al. | 455/67.11 |
| 7,593,449 B2 * | 9/2009 | Shattil | 375/130 |
| 2003/0203721 A1 * | 10/2003 | Berezdivin et al. | 455/126 |
| 2006/0227851 A1 * | 10/2006 | Shattil | 375/133 |
| 2008/0069256 A1 * | 3/2008 | Lakkis | 375/260 |
| 2008/0298339 A1 * | 12/2008 | Alamouti et al. | 370/347 |

FOREIGN PATENT DOCUMENTS

EP    222076  A2 *   5/1987

OTHER PUBLICATIONS

Caire, Giuseppe, "Bit-Interleaved Coded Modulation," IEEE Transactions on Information Theory, vol. 44, No. 3, May 1998, pp. 927-946.

* cited by examiner

METHODS, APPARATUS AND SYSTEMS FOR TERRESTRIAL WIRELESS BROADCAST OF DIGITAL DATA TO STATIONARY RECEIVERS

BACKGROUND OF THE INVENTION

The present invention relates to the delivery of digital data or multimedia via a terrestrial wireless broadcast. More specifically, the present invention relates to methods, apparatus and systems for delivery of digital data to stationary receivers over a terrestrial wireless link at a low data rate using a new coded orthogonal frequency division multiplexing (COFDM) scheme.

The term "terrestrial broadcast" generally refers to broadcasting of a signal from a point on earth, for example from a transmission tower positioned on high ground or the top of a building, rather than from a satellite transmitter.

Current terrestrial digital broadcasting schemes are complex and generally require Application Specific Integrated Circuit (ASIC) implementations to achieve the high rate throughput. Existing standards-based ASICs do not scale for use with low bandwidth application. In addition, known single carrier techniques require complex time equalization algorithms to overcome the degradation of multipath fading induced by terrestrial channels, such as the Ultra High Frequency (UHF) broadcast channel.

It would be advantageous to provide a simple and reliable way to transmit digital data via a low rate terrestrial wireless broadcast to fixed (stationary) receivers. It would be advantageous to provide a scheme for terrestrial wireless broadcast of digital data that can be implemented using simple, low cost, digital signal processor (DSP) technology.

The present invention provides methods, apparatus, and systems having the foregoing and other advantages.

SUMMARY OF THE INVENTION

The present invention relates to methods, apparatus and systems for delivery of digital data to stationary receivers over a terrestrial wireless link at a low data rate using a new coded orthogonal frequency division multiplexing (COFDM) scheme.

In one example embodiment of the present invention, a method for terrestrial broadcast of digital data to stationary receivers is provided. Digital data is encoded and modulated using coded orthogonal frequency division multiplexing (COFDM) to produce a data stream. The data stream is communicated to a stationary receiver via a terrestrial wireless link having a ratio of (i) 50% coherence bandwidth to (ii) allocated channel bandwidth of not greater than 50%.

For example, the 50% coherence bandwidth may be less than 250 kHz and the allocated channel bandwidth may be less than 500 kHz. The data stream may have a data rate of no more than about 1 Mbps.

The COFDM may comprise an 80 tone COFDM scheme. The COFDM scheme may have 4 kHz tone spacing with an approximately 50 microsecond cyclic prefix guard interval.

In addition, the COFDM scheme may comprise a COFDM scheme having a continuous in-frequency pseudo-random pilot symbol for channel estimation and timing.

Forward error correction coding (FEC) of the digital data may also be provided using any of a number of suitable FEC techniques, such as variable rate convolutional coding, low-density parity-check (LDPC) coding, Turbo coding, or concatenated coding of the digital data.

In one example embodiment, the forward error correction coding of the digital data may comprise rate ½ convolutional coding with a constraint length of K=6. In another example embodiment, the forward error correction coding of the digital data may comprise rate ¾ punctured convolutional coding of an underlying rate ½ code with a constraint length of K=6.

The method may also include block interleaving of the convolutional coded digital data. Such block interleaving may have interleaving parameters (B, M) of B=10 and M=32. Alternately, block interleaving parameters of B=15 and M=32 may be used with the present invention.

The digital data may also be modulated for communication to the stationary receiver using quadrature amplitude modulation (QAM). For example, where the block interleaving parameters (B, M) are (10, 32) the QAM may comprise rate ½ coded 16-QAM to provide a data stream having a data rate of approximately 487 kbps. The QAM may also comprise rate ¾ coded 16-QAM to provide a data stream having a data rate of approximately 740 kbps.

In an embodiment where the block interleaving parameters (B, M) are (15, 32) the QAM may comprise rate ½ coded 64-QAM to provide a data stream having a data rate of approximately 740 kbps. The QAM may also comprise rate ¾ coded 64-QAM to provide a data stream having a data rate of approximately 1.12 Mbps.

The method may also include Gray coded mapping of interleaved output bits to QAM symbols.

In an alternate embodiment, the digital data may be modulated for communication to the stationary receiver using Quadrature Phase Shift Keying (QPSK) modulation.

Satellite transmissions containing the digital data may be received at one or more satellite downlink locations. The received digital data may then be demodulated and decoded. The digital data may then be encoded and modulated in accordance with the invention as discussed above to produce the data stream for transmission to the stationary receiver via the terrestrial wireless link. After transmission, the data stream is received at the stationary receiver, where it may be demodulated and decoded (as necessary) to recover the digital data for use at the stationary receiver.

The present invention also includes apparatus for terrestrial broadcast of digital data to stationary receivers which corresponds to the foregoing methods. The apparatus includes an encoder/modulator for encoding and modulating digital data using coded orthogonal frequency division multiplexing (COFDM) to produce a data stream. A transmitter is provided for communicating the data stream to a stationary receiver via a terrestrial wireless link having a ratio of (i) 50% coherence bandwidth to (ii) allocated channel bandwidth of not greater than 50%.

The invention also encompasses a system for terrestrial broadcast of digital data to stationary receivers which corresponds to the methods discussed above. An encoder/modulator is provided for encoding and modulating digital data using coded orthogonal frequency division multiplexing (COFDM) to produce a data stream. A transmitter is provided for transmitting the data stream. The data stream is transmitted over a terrestrial wireless link having a ratio of (i) 50% coherence bandwidth to (ii) allocated channel bandwidth of not greater than 50%. The data stream is received from the transmitter by a stationary receiver via the terrestrial wireless link.

A stationary receiver is also provided in accordance with the present invention for receiving a data stream produced by the methods discussed above. The receiver includes a tuner for receiving a data stream via a terrestrial wireless link having a ratio of (i) 50% coherence bandwidth to (ii) allocated channel bandwidth of not greater than 50%. The data stream is produced by encoding and modulating digital data using coded orthogonal frequency division multiplexing (COFDM). The receiver includes a demodulator for demodulating the data stream to produce a demodulated data stream. A decoder is also provided at the receiver for decoding the demodulated data stream to recover the digital data.

The present invention also encompasses a method for receiving a data stream via a terrestrial wireless link. In accordance with the method, a data stream, which is produced by encoding and modulating digital data using coded orthogonal frequency division multiplexing (COFDM), is received via a terrestrial wireless link having a ratio of (i) 50% coherence bandwidth to (ii) allocated channel bandwidth of not greater than 50%. The received data stream is demodulated to produce a demodulated data stream. The demodulated data stream is then decoded to recover the digital data.

A data stream for carrying digital data via a terrestrial wireless link is also provided in accordance with the present invention. The data stream comprises digital data that is encoded and modulated using coded orthogonal frequency division multiplexing (COFDM) to produce the data stream adapted for communication to a stationary receiver via a terrestrial wireless link having a ratio of (i) 50% coherence bandwidth to (ii) allocated channel bandwidth of not greater than 50%.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods, apparatus and systems for delivery of digital data to stationary receivers over a terrestrial wireless link at a low data rate using a new coded orthogonal frequency division multiplexing (COFDM) scheme.

COFDM is a known, provenly robust and efficient technique which the present invention adapts for use in a terrestrial digital broadcast environment. By choosing the proper COFDM parameters, forward error correction (FEC) coding methodology, and decoding algorithms, the present invention allows for an efficient implementation in software using inexpensive DSP (Digital Signal Processor) technology.

Figure 1:
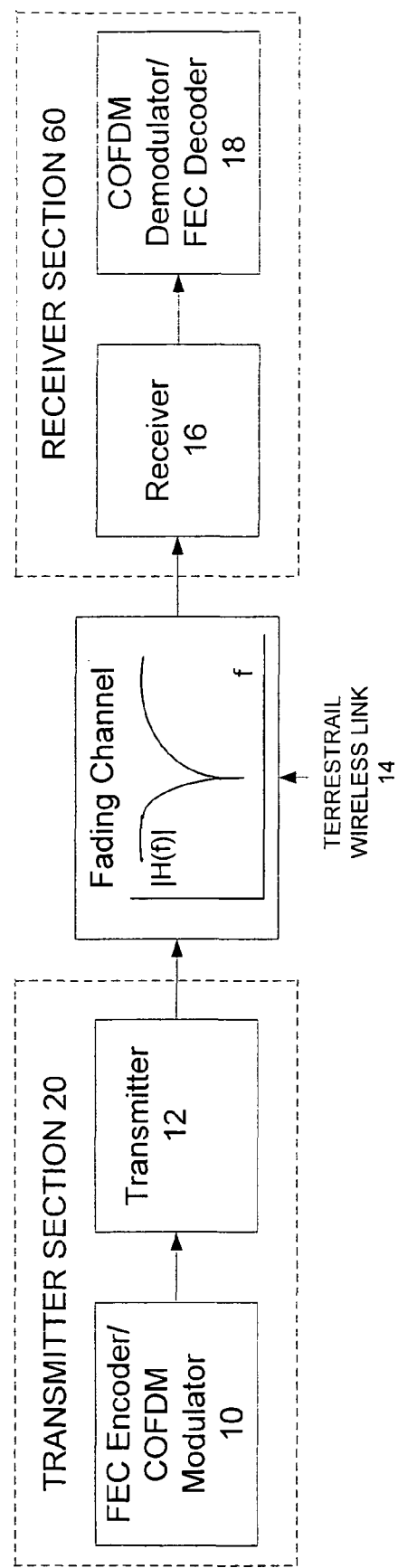
FIG. 1 shows a simplified block diagram of an example embodiment of a COFDM transmission system in accordance with the present invention.

In an example embodiment of the present invention as shown in FIG. 1, methods and systems for terrestrial broadcast of digital data to stationary receivers are provided. Digital data is encoded and modulated using coded orthogonal frequency division multiplexing (COFDM) at FEC Encoder/COFDM Modulator 10 to produce a data stream. The data stream is communicated via transmitter 12 to a stationary receiver 16 via a terrestrial wireless link (fading channel 14) having a ratio of (i) 50% coherence bandwidth to (ii) allocated channel bandwidth of not greater than 50%. The received data stream may then be demodulated and decoded at COFDM Demodulator/FEC Decoder 18.

Coherence bandwidth may be defined as the approximate maximum bandwidth or frequency interval over which two frequencies of a signal are likely to experience comparable or correlated amplitude fading. If the multipath time delay spread equals $\tau_m$ seconds, then the coherence bandwidth Bc in Hertz is given approximately by the equation:

$$Bc \simeq 1/\tau_m \quad (1)$$

The coherence bandwidth varies over UHF communications paths because the maximum multipath spread $\tau_m$ varies from path to path. The coherence bandwidth may also be described using the frequency coherence function, $\phi_C(\Delta f)$, for the channel. This function gives the correlation of fading versus frequency offset at a fixed time or assuming the channel is stationary and does not exhibit time dependent fading. The frequency coherence function is the Fourier transform of the multipath intensity profile, $\phi_c(\tau)$. A representative multipath intensity profile often used in communications systems analysis has an exponential power versus delay profile given by:

$$\phi_c(\tau) = \frac{1}{\tau_o} e^{-\tau/\tau_o} u(\tau) \quad (2)$$

where $\tau_o$ is the root-mean-square (rms) delay spread of the channel and u(t) is the unit step function. For this multipath intensity profile the frequency coherence function magnitude is $$|\phi_C(\Delta f)| = \frac{1}{\sqrt{1 + (2\pi \Delta f \tau_o)^2}} \quad (3)$$

The 50% coherence bandwidth of the channel may then be defined as the frequency range, $\Delta f$, for which $|\phi_C(\Delta f)|=0.5$. Solving equation (3) for this value yields a 50% coherence bandwidth of $$Bc, 50 \equiv \Delta f_{50\%} \approx \frac{\sqrt{3}}{2\pi\tau_o} \quad (4)$$

A representative UHF fading channel model given by the DVB Terrestrial (DVB-T) standard yields $\tau_o$=1.2 μsec and, hence, Bc,50=230 kHz from equation (4).

In an example embodiment, the 50% coherence bandwidth may be less than 250 kHz and the allocated channel bandwidth may be less than 500 kHz. The data stream may have a data rate of no more than about 1 Mbps.

The COFDM may comprise an 80 tone COFDM scheme, implemented by the FEC encoder/COFDM modulator 10. The COFDM scheme may have 4 kHz tone spacing with an approximately 50 microsecond cyclic prefix guard interval. In addition, the COFDM scheme may comprise a COFDM scheme having a continuous in-frequency pseudo-random pilot symbol for channel estimation and timing.

Forward error correction coding (FEC) of the digital data may also be provided using any of a number of suitable FEC techniques, such as variable rate convolutional coding, low-density parity-check (LDPC) coding, Turbo coding, or concatenated coding of the digital data.

In one example embodiment, the forward error correction coding of the digital data may comprise rate ½ convolutional coding with a constraint length of K=6. In another example embodiment, the forward error correction coding of the digital data may comprise rate ¾ punctured convolutional coding of an underlying rate ½ code with a constraint length of K=6.

Block interleaving of the convolutional coded digital data may also be provided at FEC encoder/COFDM modulator 10. Such block interleaving may have interleaving parameters (B, M) of B=10 and M=32. Alternately, block interleaving parameters of B=15 and M=32 may be used with the present invention.

The digital data may also be modulated at FEC encoder/COFDM modulator 10 for communication (via transmitter 12) to the stationary receiver 16 using quadrature amplitude modulation (QAM). For example, where the block interleaving parameters (B, M) are (10, 32) the QAM may comprise rate ½ coded 16-QAM to provide a data stream having a data rate of approximately 487 kbps. The QAM may also comprise rate ¾ coded 16-QAM to provide a data stream having a data rate of approximately 740 kbps.

In an embodiment where the block interleaving parameters (B, M) are (15, 32) the QAM may comprise rate ½ coded 64-QAM to provide a data stream having a data rate of approximately 740 kbps. The QAM may also comprise rate ¾ coded 64-QAM to provide a data stream having a data rate of approximately 1.12 Mbps.

Gray coded mapping of interleaved output bits to QAM symbols may also be performed at FEC encoder/COFDM modulator 10.

In an alternate embodiment, the FEC encoder/COFDM modulator 10 may modulate the digital data for communication to the stationary receiver using Quadrature Phase Shift Keying (QPSK) modulation.

The encoder/modulator 10 produces COFDM data streams suitable for terrestrial wireless transmission which have been shown to provide robust performance over a small bandwidth while maintaining relatively good performance with respect to receiver front-end perturbations from oscillator phase noise, owing to the choice of 4 kHz tone spacings. For example, such COFDM data streams may have the following parameters:

(1) a COFDM data stream having 80-tone, rate ½, 64 QAM with interleaver (B, M)=(15, 32), with a data rate of 740 kbps;

(2) a COFDM data stream having 80-tone, rate ¾, 64 QAM with interleaver (B, M)=(15, 32), with a data rate of 1.12 Mbps;

(3) a COFDM data stream having 80-tone, rate ½, 16 QAM with interleaver (B, M)=(10, 32), with a data rate of 487 kbps; and (4) a COFDM data stream having 80-tone, rate ¾ 16 QAM with interleaver (B, M)=(10, 32), with a data rate of 740 kbps.

The above examples are provided as illustrations of different COFDM data streams which may be communicated to a stationary receiver via a terrestrial wireless link having a ratio of (i) 50% coherence bandwidth to (ii) allocated channel bandwidth of not greater than 50% in accordance with the present invention. It will be apparent to those skilled in the art that the present invention is not limited to COFDM data streams having the foregoing parameters, and that the present invention will also be enabled by COFDM data streams having similar parameters.

Figure 2:
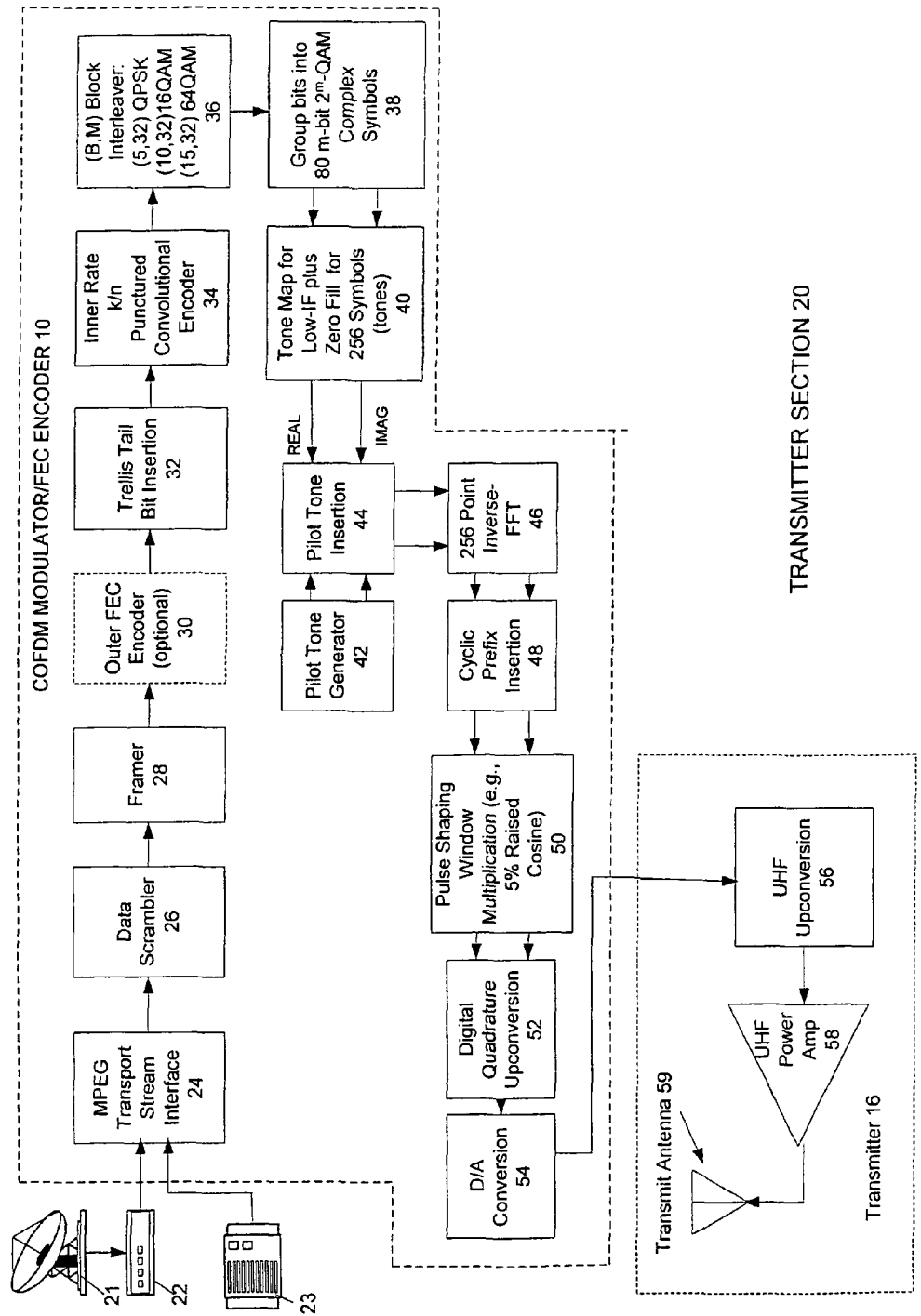
FIG. 2 shows a block diagram of an example embodiment of the transmitter section of the system shown in FIG. 1.

FIG. 2 shows a block diagram of an example embodiment of the COFDM transmitter section 20 shown in FIG. 1. Satellite transmissions containing the digital data from satellite 21 may be received at satellite receiver 22 at one or more satellite downlink locations. The received digital data may then be demodulated and decoded at the satellite receiver 22 and forwarded to the transmitter section 20, where it can be re-modulated and re-encoded in accordance with the present invention to produce a data stream for transmission to the stationary receiver 16 via the terrestrial wireless link 14. Digital data may also be provided to the transmitter section 20 from a multimedia server 23.

An MPEG Transport Stream Interface block 24 accepts the digital audio/video/data multiplex from the satellite receiver 21 and/or the multimedia server 23. This received multiplex may be nominally in an MPEG-2 transport multiplex format of 188-byte blocks. The MPEG Transport Stream Interface 24 buffers and/or selects program identifiers (PIDs) from the multiplex, inserts and/or deletes null packets to create a stream of the desired bit rate from the desired program, and adjusts program clock references (PCRs) in the downsampled A/V stream. The output of the MPEG Transport Stream Interface 24 can be viewed as a serialized bit stream. The MPEG Transport Stream Interface 24 may also perform generic data interface functions if the input stream is not audio/video (A/V) data carried in MPEG-2 transport. In such a case, the MPEG Transport Stream Interface 24 may more appropriately be called an Input Interface block.

Data Scrambler block 26 (randomizer) receives the output bit stream from the MPEG Transport Stream Interface 24 and performs an exclusive-OR (XOR) of the input bit stream with a pseudorandom noise (PN) data pattern of suitable periodicity (e.g., much longer than the COFDM block size in bits). Data Scrambler 26 reinitializes a PN generator at the end of the desired period. Data Scrambler 26 serves to randomize the incoming bit stream and produce random convolutional encoder inputs/outputs and, hence, random COFDM QAM tone values. MPEG-2 transport streams can carry null packets consisting of streams of bytes having value 0xFF (in hexadecimal) that produce all ones output out of the convolutional encoder and hence long streams of all one's QAM symbols in the COFDM IFFT. These symbols can produce high amplitude excursions in the modulator output or high peak power levels into the UHF power amplifier which is undesirable. There are known methods for reducing the peak-to-average power ratios (PAR) in COFDM transmissions including peak power limiting, clipping, complementary-code-keying, etc. Data scrambling works to prevent long duration runs of constant symbol values that can result in severe signal distortion in the presence of PAR reducing techniques.

Framer 28 groups the serial randomized, input bit stream from the Data Scrambler 26 into blocks of bits of length slightly less (by the convolutional code tail length) than the COFDM symbol length in bits, n, multiplied by the convolutional code rate, R=k/n. For example, if the 80-tone COFDM system carries rate R=½ coded 64-QAM on each tone then each tone carries 6 coded bits ($2^6$=64 for 64-QAM) formed by encoding 3 information bits into 6-bits, if outer block coding is not used. Thus, the number of bits per frame collected by the framer 28 is (80 tones)×(6 coded-bits/tone)×R=(480)(½) =240 minus the convolutional code tail bits. This frame size would be k'/n' smaller if an optional (n',k') outer block code is employed.

Outer FEC Encoder block 30 (optional) may be used to provide an outer block code around the COFDM signal. The forward error correction (FEC) scheme may use an outer block code to improve the error floor of the convolutionally encoded COFDM system. The block code could be, e.g., a Reed-Solomon code or BCH code of rate k'/n', i.e., k' input bits or symbols are encoded into n' coded bits or symbols. If an outer block code is provided, the output from Framer 28 would have to appropriately group bits and/or perform null bit insertion to attain the desired number of convolutional encoder input bits per COFDM symbol time.

Trellis Tail Bit Insertion block 32 allows a convolutional code to function as a block code. For a constraint length K, convolutional code utilizing K shift register elements, the tail bit insertion adds K−1 zeroes to the end of the information bit stream. From the convolutional (Viterbi) decoder perspective this means every convolutional "codeword" represented by a single COFDM symbol period ends in the same zero trellis state. This well-known extension mechanism improves the bit error rate (BER) performance of the Viterbi decoder in it's path memory traceback.

Figure 3:
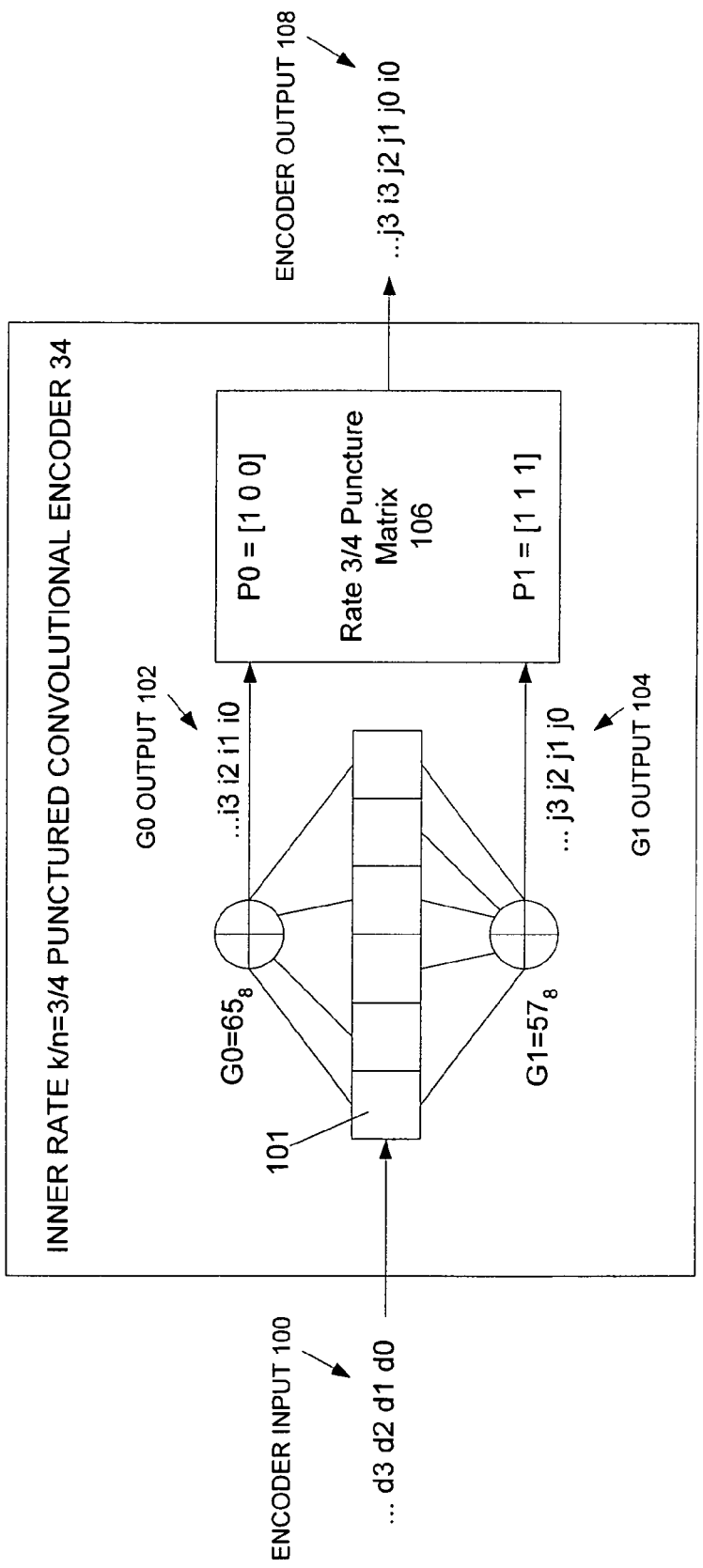
FIG. 3 shows an example embodiment of a rate ¾ punctured convolutional encoder of FIG. 2.

Inner Rate k/n Punctured Convolutional Encoder block 34 performs punctured convolutional encoding of an underlying rate ½, constraint length K, code. For example, if a rate ¾ code is desired then for every 3 input bits into the rate ½ encoder, 6 output bits are generated from which 2 are "punctured" or not sent leaving 4 transmitted code bits. FIG. 3 demonstrates the rate ¾ encoding method carried out by encoder block 34. An encoder input bit stream 100, represented by d0, d1, d2, d3, . . . is input to a K=6 encoder shift register 101 having tap weights G0=$65_8$ and G1=$57_8$ given in octal format. The underlying rate ½ encoder G0 output bit stream 102 is denoted by i0, i1, i2, . . . while the G1 output bit stream 104 is denoted by j0, j1, j2, . . . . A puncture matrix 106 is used to form a rate ¾ code and has vectors P0=[1 0 0] and P1=[1 1 1] where a "1" denotes send the corresponding bit on the channel and "0" denotes delete the bit. Thus, the encoder output 108 is given by i0, j0, j1, j2, i3, j3, . . . , where two bits out of every three from the G0 output are deleted or not sent on the channel.

The Bit Interleaved Coded Modulation (BICM) technique used in the COFDM scheme of the present invention creates a decorrelation in the bits on individual OFDM tones by interleaving the convolutional encoder output before mapping bits into QAM symbols (or tones). The Block Interleaver 36 functions to move consecutive encoder outputs far away from each other (e.g., at least a few constraint lengths apart), so that these consecutive bits modulate QAM OFDM tones that are spaced far apart in the frequency domain. If the fading channel attenuates a given tone but not others this produces a burst of tone errors and the deinterleaving function in the demodulator repositions "good" or unerrored bits near the attenuated, errored bits, reducing the number of errors over the path memory span of the Viterbi decoder to levels more near the free-distance of the code allowing for error correction. The Block Interleaver 36 can be viewed as writing it's input bits sequentially into rows of a B×M matrix memory and reading the bits out sequentially by columns. Hence, for a (15,32) interleaver, bits are written into B=15 rows of length M=32 bits and read out by columns.

Figure 4:
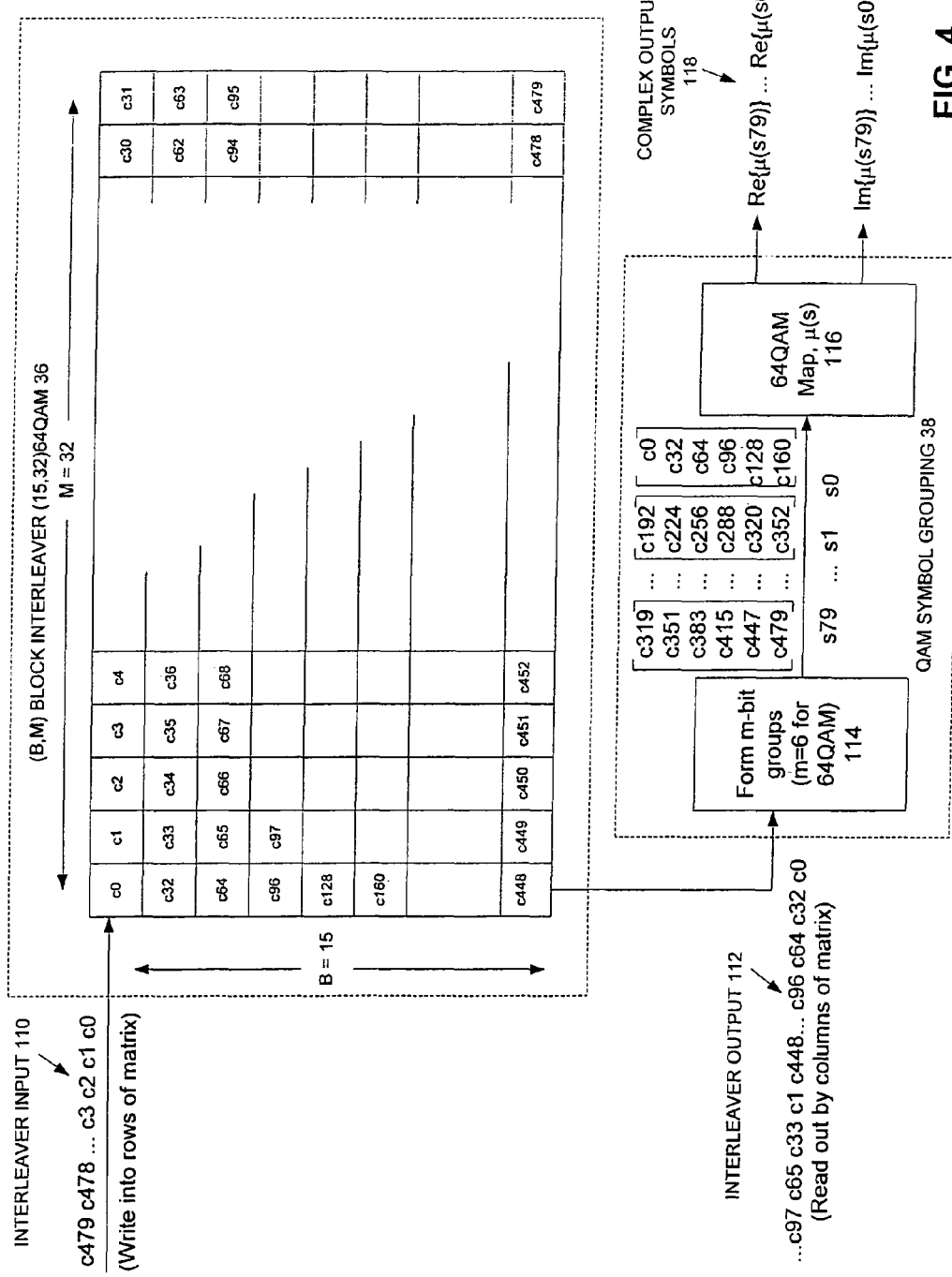
FIG. 4 shows an example embodiment of a (B,M) block interleaver block and bit to QAM symbol grouping block of FIG. 2.

An example embodiment of block interleaver 36 is illustrated in FIG. 4. FIG. 4 depicts an example block interleaving for 64-QAM in which 480 encoder output bits, denoted c0, c1, . . . , c479, are the interleaver input 110. The interleaver input 110 is written into rows of the 15×32 matrix of the block interleaver 36. The interleaver output 112 is read from successive columns of the matrix yielding bit order c0, c32, c64, c96, . . . , c448, c1, c33, c65, c97, . . . , c479. Therefore, on the channel, successive convolutional encoder output bits have been separated by M bits. The 80-tone rate ½ 64-QAM system requires 80×6=480 convolutional encoder output bits per COFDM symbol period, hence, an interleaver of dimensions B×M=480 is utilized. M is chosen to be 32 which is greater than five times the code constraint length K=6.

QAM Symbol Grouping block 38 takes the serialized (B,M) interleaver output stream and forms m-bit groups for $2^m$-QAM modulation on each OFDM tone. For example, 6-bit groups are used for 64-QAM, 4-bit groups for 16-QAM and 2-bit groups for 4-QAM (QPSK). FIG. 4 shows an example embodiment of a QAM Symbol Grouping block 38. FIG. 4 depicts the groupings for 64-QAM created by QAM Symbol grouping block 38 in which the "Form m-bit groups 114" block gathers the first six bits out of the interleaver output 112 to form a 64-QAM symbol address s0=[c0 c32 c64 c96 c128 c160], and gathers the second six bit group to form address s1=[c192 c224 c256 c288 c320 c352], etc. These m-bit groups are the address to an m-QAM Map μ(s) look-up table 116 used to obtain the real and imaginary QAM constellation complex output values 118, e.g., Re{μ(s)}+ jIm{μ(s)}=i+jq where i,q∈{±1, ±3, ±5, ±7} for 64-QAM. This look-up table performs a Gray-code mapping in which adjacent QAM constellation points differ by only 1-bit in their address values.

Figure 5:
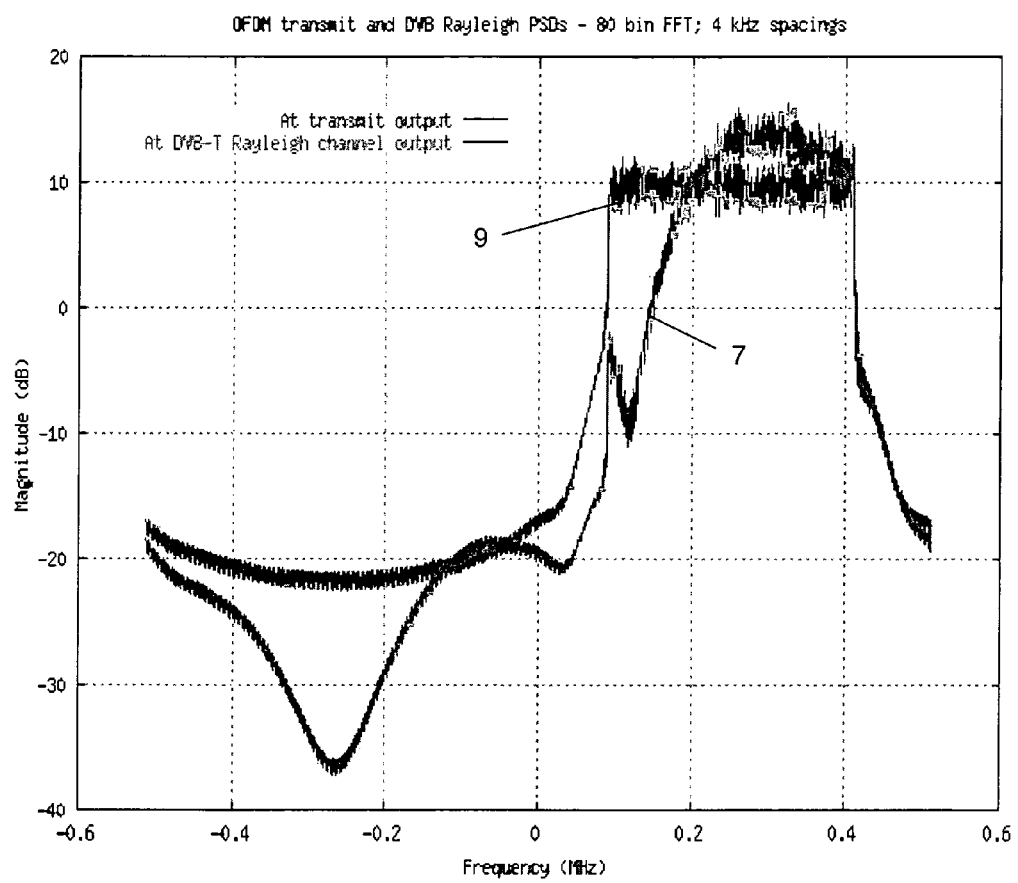
FIG. 5 shows an example embodiment of spectral densities of the fading channel input and output for a particular COFDM signal.

Tone Map and Zero-Fill to 256-Symbols block 40 provides a 256-point Inverse Fast Fourier Transform (IFFT) length, which allows for suitable oversampling to prevent aliasing in the 80-tone COFDM transmission. The 80-tones generated by prior blocks of the transmitter 20 carry the encoded A/V data. Prior to performing the 256-point IFFT, the 80 complex symbol values must be extended to 256 complex values by adding zeroes. There is flexibility in choosing how to map the 80 data carrying QAM symbols to OFDM tones. The D/A conversion rate and desired complexity in the Digital Quadrature Upconversion block 52 (described below) can be traded off with the 80 tone mapping in frequency. For example, a sample rate of 1.024 MHz may be assumed for the 256-point IFFT operation which imposes a tone spacing of 1.024 MHz/ 256=4 kHz. The lowest data carrying "tone" in the OFDM signal can be mapped to bin 23 while the highest tone can be mapped to bin 23+80−1=102 where FFT bins are numbered 0, . . . , 255; all other bin values would be set to zero before the IFFT was performed. In terms of spectral occupancy, FIG. 5 shows the spectral density at the pulse shaping window multiplication output for this tone selection. The faded 80-tone OFDM spectrum 7 is shown for the DVB-T portable (Rayleigh) channel, along with the ideal transmitted spectrum 9. The $23^{rd}$ bin occurs roughly at 4 kHz×23=92 kHz=0.092 MHz while the upper tone of the spectrum occurs at 103×4 kHz=412 kHz=0.412 MHz. The signal spectrum 9 thus occupies about 320 kHz in it's passband and rolls off slowly outside that band.

The subsequent Digital Quadrature Upconversion block 52 upsamples the signal to a higher D/A sample rate and performs anti-alias filtering. If a larger IFFT and higher sample rate can be performed within the transmitter hardware constraints, then the anti-alias filtering and upsampling requirements of the Digital Quadrature Upconversion block 52 can be relaxed.

A continuous-in-frequency pilot symbol may be used to aid channel estimation and equalization. Pilot tones (symbols) are generated by Pilot Tone Generator 42. Every 50 COFDM symbol periods a pilot symbol may be inserted by Pilot Tone Inserter 44. Thus, the data throughput will be reduced by 1/50 or 2% for this non-information bearing signal transmission. An 80-bit PN sequence (truncated from the 128-bit PN sequence formed from the generator polynomial $g(x)=1+x^3+x^7$) may be used to select the QAM constellation points used on each of the 80-tones in the pilot symbol transmission. The PN shift register is initialized to 0x7F (i.e., all ones) and then clocked 80 times. The 80 output bit values are used to select 80 pilot tone QAM constellation values from the antipodal set $\{\xi+j\xi, -\xi, -j\xi\}$ where $\xi+j\xi$, is used on the tone if the PN sequence value is 0 and $-\xi-j\xi$ is used if the PN sequence value is 1. The value of $\xi$ is 7 for 64-QAM, 3 for 16QAM and 1 for 4-QAM (QPSK). These values produce a maximum amplitude constellation point on each QAM carrying tone in the pilot symbol. Hence, the pilot symbol has a higher average power than the data carrying symbols. The power of a data symbol is given by $$P = 2N_T \frac{4M_Q^2 - 1}{3}$$

where $N_T=80$ is the number of tones per symbol and $M_Q=1, 2,$ or 4 for 4-QAM, 16-QAM, or 64-QAM, respectively. The power of a pilot symbol is given by $P_{pilot}=2N_T(2M_Q-1)^2$, hence, the pilot tone has power $$P/P_{pilot} = \frac{3(2M_Q - 1)^2}{4M_Q^2 - 1}$$

times greater than a data symbol, i.e, $P/P_{pilot}=1$ (0 dB) for QPSK, 1.8 (2.6 dB) for 16-QAM, and 2.3 (3.7 dB) for 64-QAM. This added power in the pilot symbols implies that the average transmitter power increases by 51/50=1.02 (0.086 dB) for QPSK tones, 51.8/50=1.036 (0.15 dB) for 16-QAM, and 52.33/50=1.047 (0.20 dB) for 64-QAM. The higher pilot symbol power allows for better equalization in the receiver since the pilot tones are received at higher amplitudes above the receiver noise floor than data, even in the presence of channel fades.

The 256 Point IFFT block 46 performs a 256-point IFFT following data tone mapping and pilot symbol insertion to develop the time domain sequence of samples. The output is a complex data stream i+jq.

Cyclic Prefix Insertion block 48 provides a guard time that extends beyond the multipath channel impulse response. The purpose of the cyclic prefix in ODFM is to maintain orthogonality among the subcarriers and prevent InterSymbol Interference (ISI) in the presence of multipath channel echoes and pre-echoes. For example, the last $T_g$ seconds of samples from the complex 256-point IFFT output may be replicated and prepended to the IFFT output samples to form a cyclic prefix.

Pulse Shaping Window Multiplication block 50 use a post-IFFT window function to limit the spectral occupancy of the signal. For example, the cyclic prefix prepended IFFT output samples may be multiplied by a time domain raised cosine pulse shape window function w(t). For example, w(t) may be given by:

$$w(t) = \begin{cases} 0.5 + 0.5\cos(\pi + t\pi/\beta T_s) & 0 \le t \le \beta T_s \\ 1.0 & \beta T_s \le t \le T_s \\ 0.5 + 0.5\cos((t - T_s)\pi/\beta T_s) & T_s \le t \le (1 + \beta)T_s \end{cases}$$

This pulse shaping window affects (reduces) the spectral occupancy of the transmitted signal but also reduces the effective guard time of the cyclic prefix. Both real and imaginary parts of the IFFT output are multiplied by this window function.

As discussed above, Digital Quadrature Upconversion block 52 forms a convenient output intermediate frequency (IF) signal for the subsequent UHF upconversion/amplification stages. This stage may also perform antialias filtering and upsampling to the D/A converter sample rate.

D/A Conversion block 54 takes the real digital sample stream from the Digital Quadrature Upconversion block 52 and outputs an analog signal having low IF COFDM carrier. For example, for a sample rate of 100 MHz the COFDM carrier might be centered at 44 MHz.

The transmitter 16 of FIG. 1 may comprise a UHF transmitter consisting of a UHF Upconversion block 56 and a Power Amplifier 58. The UHF Upconversion block 56 frequency shifts the signal to the desired UHF carrier frequency (e.g., 900 MHz). The power amplifier 58 boosts the power to a desired level (e.g., 20 kW or 30 kW). The output of the power amplifier 58 is sent to a UHF transmit antenna 59 mounted on a tower or roof (e.g., 200 feet above the average terrain level).

Figure 6:
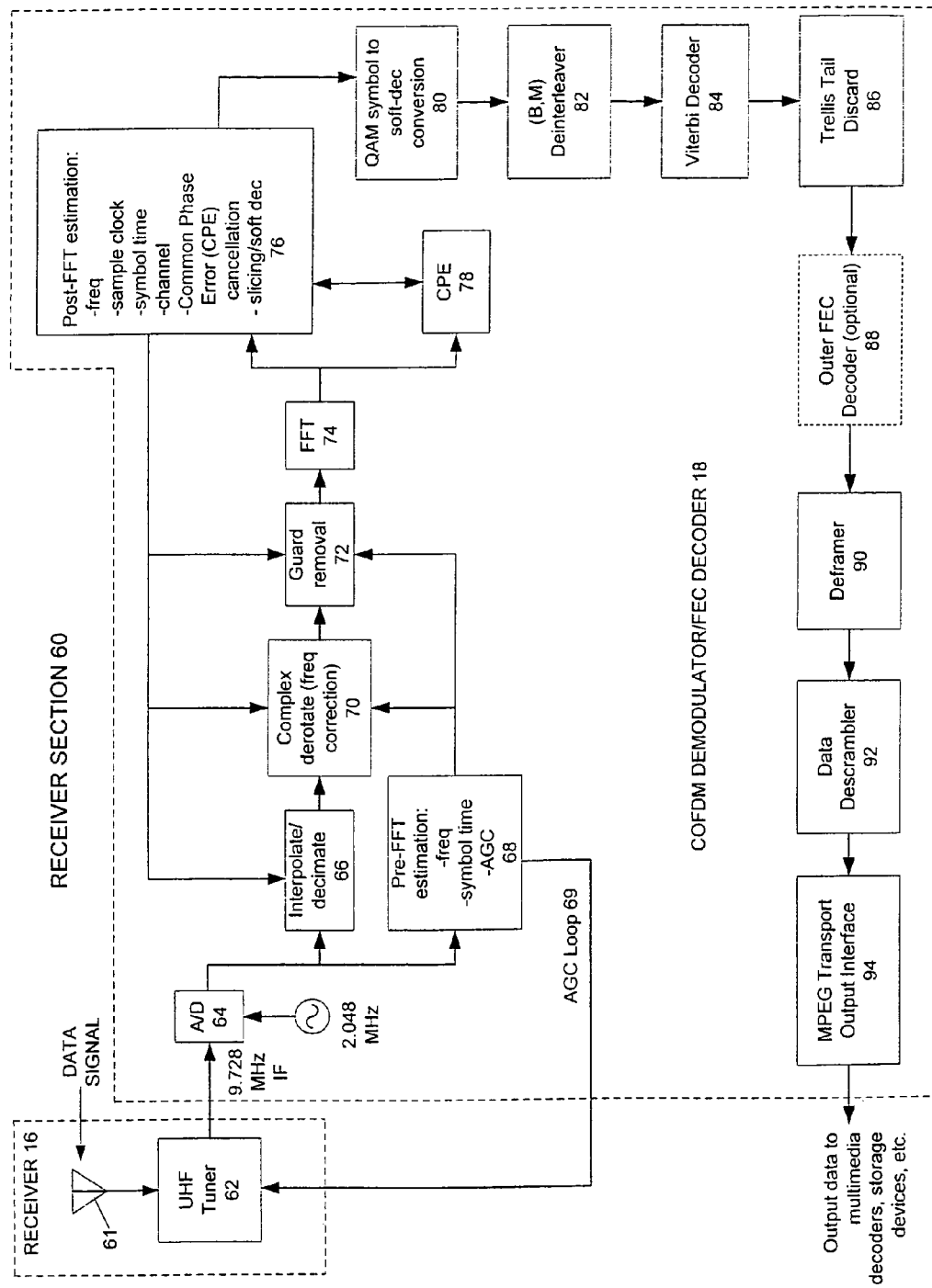
FIG. 6 shows a block diagram of an example embodiment of the receiver section of the system shown in FIG. 1.

FIG. 6 shows a block diagram of an example embodiment of the COFDM receiver section 60 shown in FIG. 1.

The tuner 62 receives the COFDM signal via a UHF antenna 61 at the UHF carrier frequency (e.g. 900 MHz) and amplifies and downconverts the signal to a suitable near baseband IF frequency.

The A/D converter 64 samples or subsamples the COFDM signal to produce a baseband complex i+jq signal. Since the A/D sample clock may be free-running and not locked to the incoming symbol period, a digital interpolator/resampler 66 may be used to derive complex samples at a frequency locked to the transmitted signal sample/symbol rate. An error signal from the post-FFT sample clock estimator 76 is used to drive a feedback loop (digital phase-locked-loop). An effective resampler may be based on the Farrow cubic or quadratic, polynomial interpolator.

The pre-FFT estimation block 68 forms estimates of the carrier frequency offset, symbol timing, and amplitude. The amplitude estimates are used in an Automatic Gain Control (AGC) loop 69 to adjust the downconverted signal level to a targeted amplitude at the A/D input. The carrier frequency estimate is made partially through correlation of the signal with itself over a time duration equal to the guard interval. For example, if there are N points in the receiver FFT and $r_n$ represents the complex received sample at discrete time n, then the correlation value $x_n = r_n \cdot r^*_{n-N} \propto e^{j2\pi \Delta f}$+noise can be averaged over the number of cyclic prefix signals gives an estimate of the fractional frequency offset, $\Delta f$ (i.e., the offset modulo the tone spacing, e.g., −2 kHz<$\Delta f$<2 kHz for 4 kHz bin spacings). The integer frequency (bin) offset can be found by correlating with the received signal with the known pilot symbol values. A similar correlation can be used to find the coarse symbol time, i.e., correlating the received samples with samples N time samples earlier produces a large correlation spike when the cyclic prefix is encountered, which denotes the start of an OFDM symbol period.

The complex derotator block 70 removes residual frequency offsets in the downconverted complex carrier. The fractional and integer (bin) frequency offsets are removed from the signal through multiplication by $e^{j2\pi(\Delta f+F)}$ where $\Delta f$ is the fractional offset and $F=n_1 \cdot (4\text{ kHz})$ is the integer bin offset for a 4 kHz bin spacing.

The guard removal block 72 simply deletes the cyclic prefix samples from the received complex sample stream.

The FFT block 74 forms the heart of the receiver and reverses the IFFT function performed at the transmitter. The output of the FFT block is the complex QAM constellation values.

The post-FFT estimation block 76 uses the complex FFT output samples to further refine estimates of the carrier offset frequency, sample clock time, symbol period, common phase error, channel gain and phase, and performs the slicing of received signals into QAM constellation points forming soft-decision values for Viterbi decoding. The integer part of the carrier frequency offset is determined using the pilot symbols which will have their tones shifted by $n_1$ bins if there is remaining frequency error. The sample clock and symbol period frequency errors can also be tracked using the pilot symbols using early-late gate estimates. Known early and late sets of pilot samples are correlated with the received post FFT signal and used to drive the phase-locked interpolater/decimator time tracking loop. Common phase error (CPE), detected at block 78, can be caused by untracked phase noise in the analog UHF tuner. This slowly varying phase noise causes a phase shift in all OFDM tones that may not be detected by the channel phase estimator function. The slicing function finds the closest QAM constellation point to the received signal value.

Channel gain and phase estimation performed in post-FFT estimation block 76 determines the channel gain and phase induced on each COFDM tone by the fading channel. The transmitted continuous-in-frequency pilot tone denoted, $P_k$, k=0, ... 79, for the 80 tone COFDM system take values from the set $\{\xi+j\xi, -\xi-j\xi\}$ based on the known PN sequence generator output values described above; the receiver uses the same PN generator and 0x7F seed as the transmitter to generate a reference set of complex tone values. Given the noisy FFT block 74 output received complex QAM symbol values denoted $R_k$, k=0, ... 79, corresponding to the desired pilot carrying tones transmitted every 50 COFDM symbols, an estimate of the inverse of the complex fading channel gain is $\alpha_k=P_k/R_k$, k=0, ... 79. These estimates may be filtered to reduce the effects of noise by simple averaging over a suitable number of estimates or refined using minimum mean-square estimation (MMSE); MMSE yields slightly improved channel gain estimates. Denote the smoothed inverse channel gain estimate as $\alpha_k'$. A single tap Frequency Domain Equalization (FDE) is then performed by multiplying the noisy FFT block output values of each data carrying COFDM symbol by the smoothed inverse channel gain estimate, $\alpha_k'$. The inverse channel gain estimate gives Channel State Information (CSI) that is useful for erasing bits from deeply faded QAM symbols in the Soft Decision block described next.

Figure 7:
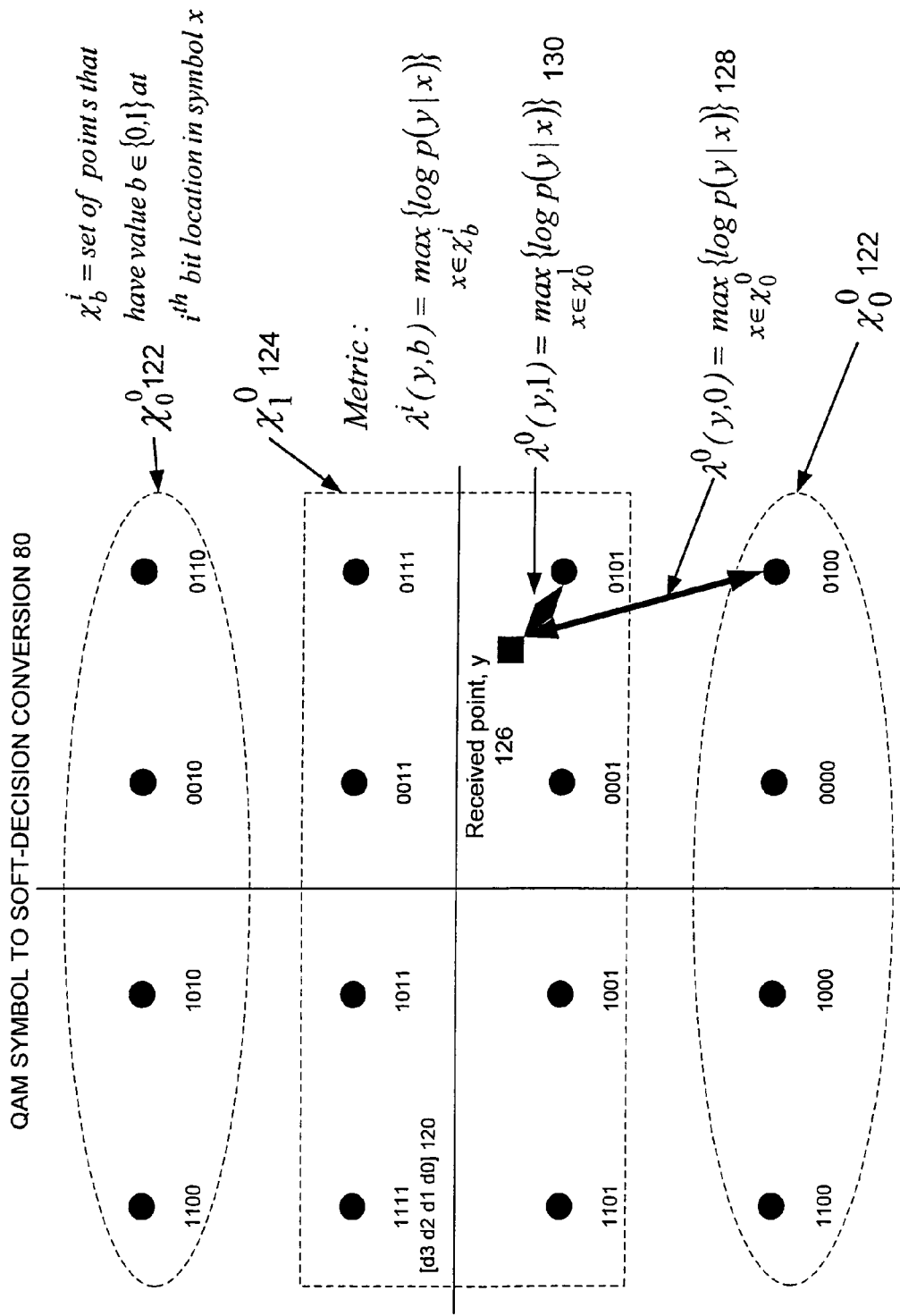
FIG. 7 shows an example embodiment of the QAM symbol to soft decision conversion operations of the receiver shown in FIG. 6.

QAM Symbol-to-Soft-Decision Conversion block 80 implements soft-decision threshold equations and Channel State Information (CSI) erasure insertion that are used to improve Viterbi decoded BER performance. FIG. 7 depicts the soft decision algorithm which occurs at QAM Symbol-to-Soft Decision Conversion block 80. The soft decision algorithm components are shown for the $0^{th}$ bit, d0, of a 16-QAM constellation in which the constellation signal points are labeled with data bit addresses as [d3 d2 d1 d0] 120 from most significant to least significant bit. The algorithm is adapted from G. Caire et. al. "Bit-interleaved coded modulation", *IEEE Trans. Inform. Theory*, vol. 44, pp. 927-946, May, 1998. The constellation points grouped into sets $\chi_b^i$ have value b∈{0,1} at bit location di, i=0, 1, 2, ..., m−1 of the data bit address. Signal points in the elliptically bound regions, $\chi_0^0$ 122, of FIG. 7 have data value 0 in bit location d0 while signal points in the rectangularly bound region, $\chi_1^0$ 124, have data value 1 in bit location d0. This block forms soft-decision likelihood ratios for assumed 0 bit value, $\lambda^i(y,0)$ 128, and assumed 1 bit value, $\lambda^i(y,1)$ 130, for each bit di, i=0, 1, ..., m−1 of the $2^m$-QAM constellation. These values are computed by maximizing the logarithm of the channel transition probability, i.e., given that $x \in \chi_b^i$ is the bit sent by the transmitter and the receiver demodulates the received point, y 126, then $$\lambda^i(y, b) = \max_{x \in \chi_b^i}\{\log p(y \mid x)\}$$

is the soft-decision for bit di taking value b given the received point, y. This metric is further simplified in the example embodiment by minimizing Euclidean distance in place of maximizing the log $\{p(y|x)\}$. In FIG. 7, the Euclidean distance between the signal point in the elliptical regions, $\chi_0^0$ 122, closest to the received point, y 126, becomes the soft-decision, $\lambda^0(y,0)$ 128, while the Euclidean distance between the signal point in the rectangular region, $\chi_1^0$ 124, closest the received point, y 126 becomes the soft-decision $\lambda^1(y,0)$ 130. These metrics are scaled, quantized, and saturated in the example embodiment which improves Viterbi decoder Bit Error Rate (BER) performance. The saturated metric is $\lambda_{sat}^i(y,b)=\min\{\lfloor 16\lambda^i(y,b)\rfloor, 64\}$ where $\lfloor x \rfloor$ is the largest integer less than or equal to x. A further adaptation of the algorithm in the example embodiment involves zeroing, i.e., erasing, the metrics $\lambda^i(y,b)$ for QAM tones in which deep channel fades are detected. Assuming the fading channel is very slowly time varying or not time varying (no Doppler shifts) for this stationary transmitter, stationary receiver multipath channel, the smoothed inverse channel gain estimate, $\alpha_k'$, for the k-th tone will be large for tones that are deeply faded, for example as in the region around 0.12 MHz for the faded curve 7 in FIG. 5. In the example embodiment the FDE inverse channel gain estimates, $\alpha_k'$, drive the received point, y 126 in FIG. 7 to have complex value i+jQ, i,q∈{±1, ±3, ±5, ±7} for 16-QAM in the absence of fades and receiver noise; for this scaling it is found in the example embodiment that a good choice for the threshold for erasing (zeroing) $\lambda_{sat}^i(y,b)$ is for the magnitude of FDE gain $|\alpha_k'| \geq 3$. This use of CSI lowers the signal-to-noise ratio (SNR) required to achieve BER=$10^{-4}$ by over 6 dB for the DVB-T portable fading channel model when using rate ½ 64-QAM on the 80-tone COFDM system.

The (B,M) deinterleaver 82 is actually two deinterleavers; one for the "0" bit value soft decisions $\lambda^i(y,0)$ and the other for the "1" bit value soft decisions $\lambda^i(y,1)$. The soft-decisions are written into the B×M deinterleaver columns and read out by rows to reverse the interleaving described above.

The remaining receiver blocks, which include the Viterbi decoder 84, the trellis tail discard block 86, the optional outer FEC decoder 88, the deframer 90, the data descrambler 92, and the MPEG transport output interface 94, perform decoding, deframing, and descrambling functions consistent with the corresponding functions described above in connection with the convolutional encoder 34, the Trellis tail bit insertion block 32, the optional outer FEC encoder block 30, the framer 28, the data scrambler 26, and the MPEG transport stream interface block 24 of FIG. 2, respectively, in order to output a usable data stream to multimedia decoders and/or storage devices.

It should now be appreciated that the present invention provides advantageous methods, apparatus, and systems for terrestrial wireless broadcast of digital data to stationary receivers.

Although the invention has been described in connection with various illustrated embodiments, numerous modifications and adaptations may be made thereto without departing from the spirit and scope of the invention as set forth in the claims.

What is claimed is:

1. A method for terrestrial broadcast of digital data to stationary receivers, comprising:
    encoding and modulating digital data by an encoder and modulator, respectively, using coded orthogonal frequency division multiplexing (COFDM) to produce a data stream; and
    communicating said data stream to a stationary receiver via a terrestrial wireless link having a ratio of (i) 50% coherence bandwidth to (ii) allocated channel bandwidth of not greater than 50%,
    wherein the 50% coherence bandwidth is defined as a channel frequency coherence function, $\phi_c(\Delta f)$ for which a magnitude of the channel frequency coherence function is 0.5, the channel frequency coherence function having a multipath intensity profile with the magnitude described by the equation:

$$|\phi_C(\Delta f)| = \frac{1}{\sqrt{1 + (2\pi \Delta f \tau_o)^2}};$$

where $\tau_o$ is a root-mean-square delay spread of the channel.

2. A method in accordance with claim 1, wherein:
    said 50% coherence bandwidth is less than 250 kHz; and
    said allocated channel bandwidth is less than 500 kHz.

3. A method in accordance with claim 1, wherein:
    said data stream has a data rate of no more than about 1 Mbps.

4. A method in accordance with claim 1, wherein:
    said COFDM comprises an 80 tone COFDM scheme.

5. A method in accordance with claim 1, wherein:
    said COFDM comprises a COFDM scheme having 4 kHz tone spacing.

6. A method in accordance with claim 1, wherein:
    said COFDM comprises a COFDM scheme with an approximately 50 microsecond cyclic prefix guard interval.

7. A method in accordance with claim 1, wherein:
    said COFDM scheme comprises a COFDM scheme having a continuous in-frequency pseudo-random pilot symbol for channel estimation and timing.

8. A method in accordance with claim 1, further comprising:
    forward error correction coding of said digital data using one of variable rate convolutional coding, low-density parity-check (LDPC) coding, Turbo coding, or concatenated coding of said digital data.

9. A method in accordance with claim 8, wherein:
    said forward error correction coding of said digital data comprises rate ½ convolutional coding with a constraint length of K=6.

10. A method in accordance with claim 8, wherein:
    said forward error correction coding of said digital data comprises rate ¾ punctured convolutional coding with a constraint length of K=6.

11. A method in accordance with claim 8, further comprising:
    block interleaving of said convolutional coded digital data.

12. A method in accordance with claim 11, wherein:
    said block interleaving has interleaving parameters (B, M) of B=10 and M=32.

13. A method in accordance with claim 12, further comprising:
    modulating said digital data for communication to said stationary receiver using quadrature amplitude modulation (QAM).

14. A method in accordance with claim 13, wherein:
    said QAM comprises rate ½ coded 16-QAM; and
    a data rate of said data stream is approximately 487 kbps.

15. A method in accordance with claim 13, wherein:
    said QAM comprises rate ¾ coded 16-QAM; and
    a data rate of said data stream is approximately 740 kbps.

16. A method in accordance with claim 13, further comprising:
    Gray coded mapping of interleaved output bits to QAM symbols.

17. A method in accordance with claim 11, wherein:
    said block interleaving has interleaving parameters (B, M) of B=15 and M=32.

18. A method in accordance with claim 17, further comprising:
    modulating said digital data for communication to said stationary receiver using quadrature amplitude modulation (QAM).

19. A method in accordance with claim 18, wherein:
    said QAM comprises rate ¾ coded 64-QAM; and
    a data rate of said data stream is approximately 1.12 Mbps.

20. A method in accordance with claim 18, wherein:
    said QAM comprises rate ½ coded 64-QAM; and
    a data rate of said data stream is approximately 740 kbps.

21. A method in accordance with claim 8, further comprising:
    modulating said digital data for communication to said stationary receiver using Quadrature Phase Shift Keying (QPSK) modulation.

22. A method in accordance with claim 1, further comprising:
    receiving satellite transmissions containing said digital data at one or more satellite downlink locations;
    demodulating and decoding said received digital data prior to said encoding and modulating which produces said data stream for transmission to said stationary receiver via said terrestrial wireless link.

23. A method in accordance with claim 1, further comprising:
    receiving said data stream at said stationary receiver;
    demodulating and decoding said data stream to recover said digital data for use at said stationary receiver.

24. Apparatus for terrestrial broadcast of digital data to stationary receivers, comprising:
    an encoder and modulator for encoding and modulating digital data using coded orthogonal frequency division multiplexing (COFDM) to produce a data stream; and a transmitter for communicating said data stream to a stationary receiver via a terrestrial wireless link having a ratio of (i) 50% coherence bandwidth to (ii) allocated channel bandwidth of not greater than 50%, wherein the 50% coherence bandwidth is defined as a channel frequency coherence function, $\phi_c(\Delta f)$ for which a magnitude of the channel frequency coherence function is 0.5, the channel frequency coherence function having a multipath intensity profile with the magnitude described by the equation:

$$|\phi_C(\Delta f)| = \frac{1}{\sqrt{1 + (2\pi\Delta f \tau_o)^2}};$$

where $\tau_o$ is a root-mean-square delay spread of the channel.

25. A system for terrestrial broadcast of digital data to stationary receivers, comprising:
an encoder and modulator for encoding and modulating digital data using coded orthogonal frequency division multiplexing (COFDM) to produce a data stream;
a transmitter for transmitting said data stream;
a terrestrial wireless link having a ratio of (i) 50% coherence bandwidth to (ii) allocated channel bandwidth of not greater than 50%; and
a stationary receiver for receiving said data stream from said transmitter via said terrestrial wireless link %,
wherein the 50% coherence bandwidth is defined as a channel frequency coherence function, $\phi_c(\Delta f)$ for which a magnitude of the channel frequency coherence function is 0.5, the channel frequency coherence function having a multipath intensity profile with the magnitude described by the equation:

$$|\phi_C(\Delta f)| = \frac{1}{\sqrt{1 + (2\pi\Delta f \tau_o)^2}};$$

where $\tau_o$ is a root-mean-square delay spread of the channel.

26. A stationary receiver for receiving a data stream via a terrestrial wireless link, said receiver comprising:
a tuner for receiving a data stream via a terrestrial wireless link having a ratio of (i) 50% coherence bandwidth to (ii) allocated channel bandwidth of not greater than 50%, said data stream produced by encoding and modulating digital data using coded orthogonal frequency division multiplexing (COFDM);
a demodulator for demodulating said data stream to produce a demodulated data stream; and
a decoder for decoding said demodulated data stream to recover said digital data,
wherein the 50% coherence bandwidth is defined as a channel frequency coherence function, $\phi_c(\Delta f)$ for which a magnitude of the channel frequency coherence function is 0.5, the channel frequency coherence function having a multipath intensity profile with the magnitude described by the equation:

$$|\phi_C(\Delta f)| = \frac{1}{\sqrt{1 + (2\pi\Delta f \tau_o)^2}};$$

where $\tau_o$ is a root-mean-square delay spread of the channel.

27. A method for receiving a data stream via a terrestrial wireless link, said method comprising:
receiving a data stream via a terrestrial wireless link having a ratio of (i) 50% coherence bandwidth to (ii) allocated channel bandwidth of not greater than 50%, said data stream produced by an encoder and modulator to encode and modulate digital data using coded orthogonal frequency division multiplexing (COFDM);
demodulating said data stream to produce a demodulated data stream;
decoding said demodulated data stream to recover said digital data,
wherein the 50% coherence bandwidth is defined as a channel frequency coherence function, $\phi_c(\Delta f)$ for which a magnitude of the channel frequency coherence function is 0.5, the channel frequency coherence function having a multipath intensity profile with the magnitude described by the equation:

$$|\phi_C(\Delta f)| = \frac{1}{\sqrt{1 + (2\pi\Delta f \tau_o)^2}};$$

where $\tau_o$ is a root-mean-square delay spread of the channel.

* * * * *